United States Patent
Jung

(10) Patent No.: US 6,823,836 B2
(45) Date of Patent: Nov. 30, 2004

(54) SUPPLEMENTARY BRAKE FOR A VEHICLE

(75) Inventor: Jong-Yun Jung, Chonrabuk-Do (KR)

(73) Assignee: Hyundai Motor Company, Seoul (KR)

(*) Notice: Subject to any disclaimer, the term of this patent is extended or adjusted under 35 U.S.C. 154(b) by 115 days.

(21) Appl. No.: 10/261,180

(22) Filed: Sep. 30, 2002

(65) Prior Publication Data

US 2003/0080610 A1 May 1, 2003

(30) Foreign Application Priority Data

Nov. 1, 2001 (KR) .......................................... 2001-67791

(51) Int. Cl.[7] ............................................. F02D 13/04
(52) U.S. Cl. ...................................... 123/322; 123/321
(58) Field of Search .................................. 123/321, 322

(56) References Cited

U.S. PATENT DOCUMENTS

| | | | | |
|---|---|---|---|---|
| 4,741,307 A | * | 5/1988 | Meneely | ...................... 123/321 |
| 4,898,128 A | * | 2/1990 | Meneely | ...................... 123/321 |
| 4,936,273 A | * | 6/1990 | Myers | ........................ 123/321 |
| 5,718,199 A | * | 2/1998 | Hu et al. | ..................... 123/322 |
| 6,647,953 B1 | * | 11/2003 | Langewisch | ................ 123/321 |

* cited by examiner

Primary Examiner—Tony M. Argenbright
(74) Attorney, Agent, or Firm—Morgan Lewis & Bockius LLP

(57) ABSTRACT

A supplementary brake for a vehicle adapted for use in a heavy duty vehicle to supplement the capacity of a main brake system for obtaining sufficient braking efficiency. The brake comprises an oil pressure supplying unit, an oil pressure control unit for controlling oil pressure, a pulsatory pressure forming unit for forming a pulsatory pressure to the oil pressure supplied from the oil pressure control unit to the profile of an engine injection cam, a valve opening and closing unit for opening an closing an exhaust valve of an engine according to the pulsatory pressure formed by the pulsatory pressure forming unit, and a controller for controlling the oil pressure supply unit according to the operating state of the engine.

4 Claims, 3 Drawing Sheets

SUPPLEMENTARY BRAKE FOR A VEHICLE

FIELD OF THE INVENTION

The present invention relates to a brake system used for a heavy-duty truck or bus, and more particularly, to a brake adapted to supplement the capacity of a main brake system for obtaining sufficient braking in a heavy duty vehicle.

BACKGROUND OF THE INVENTION

Heavy duty trucks, buses or the like, being heavy in weight and load need good braking capacity for sufficient braking performance. However, there is a problem in that a main brake system alone cannot hold the heavy weight, load and vehicle itself due to oversized parts and load concentrations, such that an appropriate supplementary brake is provided in the form of an exhaust brake, retarder and the like.

Among such supplementary brakes, the exhaust brake is typically mounted inside the exhaust pipe including a butterfly valve by which exhaust gas discharged from the engine is blocked to reduce engine revolutions and thereby slow down the speed of the vehicle when braking power is needed. However, in such a brake, if back pressure inside the exhaust pipe rises beyond a critical level, erroneous operation occurs in the engine exhaust valve, causing damage to the engine. Also, because the butterfly valve cannot be completely closed, it is difficult for an exhaust brake to obtain a sufficient braking performance as a supplementary brake.

Furthermore, there is a problem with the butterfly valves typically employed in that the back pressure of the exhaust pipe generated when the exhaust brake is operated gradually deteriorates the exhaust brake capability.

SUMMARY OF THE INVENTION

The present invention provides a supplementary brake for a vehicle adapted to be used particularly in diesel-engine, heavy-duty commercial vehicles as an improved exhaust brake for improved braking capability and durability.

In accordance with an embodiment of the present invention, there is provided an oil pressure supplying means and oil pressure control means for controlling the oil pressure supplied from the oil pressure supplying means. A pulsatory pressure forming means forms a pulsatory pressure in the oil pressure supplied from the oil pressure control means in accordance with the profile of an engine injection cam. A valve opening and closing means opens and closes the exhaust valve of the engine according to pulsatory pressure formed by the pulsatory pressure forming means. A controller controls the oil pressure supply means according to the operating state of the engine.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, the preferred embodiments of the present invention will be described in detail with reference to the accompanying drawings.

Figure 1:
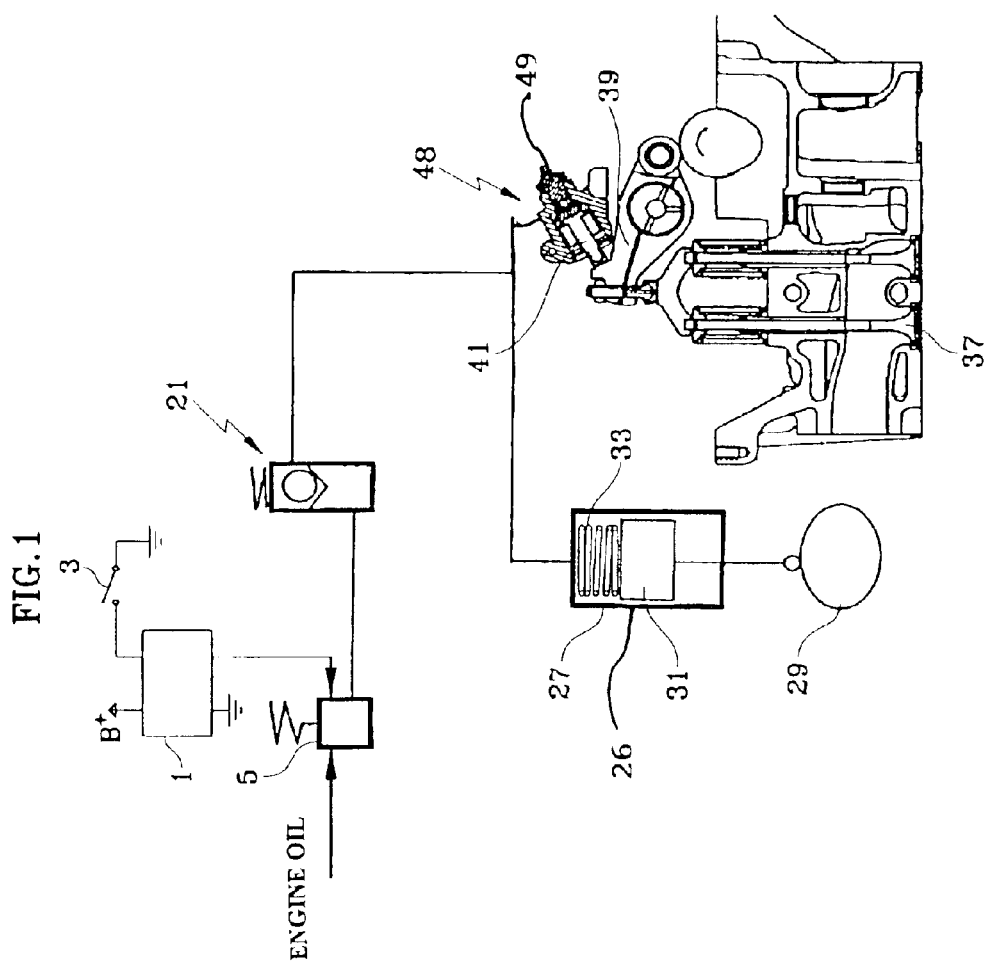
FIG. 1 is a block diagram illustrating the construction of an engine brake according to the present invention.

As shown in FIG. 1, a supplementary brake for a vehicle according to the present invention comprises an oil pressure supply means 5 and oil pressure control means 21 for controlling oil pressure supplied from the oil pressure supplying means. A pulsatory pressure forming means 26 forms a pulsatory pressure in oil supplied from the oil pressure control means 21 in accordance with the profile of the engine injection cam 29. A valve opening and closing means 48 opens and closes the exhaust valve 37 according to the pulsatory pressure formed by the pulsatory pressure forming means 26. A controller 1 controls the oil pressure supply means 5 according to the operating state of the engine.

Controller 1 receives engine brake operating instructions from the driver through switch 3, and determines the vehicle condition as to whether the engine and drive shaft are connected by way of a released clutch pedal. The controller 1 also determines whether the driver is not stepping on the accelerator pedal. If the driver steps on the accelerator pedal to try to accelerate, the controller 1 stops the braking operation activity. The controller 1 then determines whether or not the gear shift is in neutral position. If the gear shift is in the neutral position, the controller 1 stops the braking operation promptly, and when the braking operation is in motion, stops the fuel injection.

Controller 1 may comprise a processor and memory, with associated hardware and software, as may be selected and programmed by a person of ordinary skill in the art to execute the control functions described herein. In one preferred alternative embodiment, an existing engine Electronic Control Unit (ECU) may be used as controller 1 in an electronically-controlled diesel engine with added functions and programming as described herein.

Oil pressure supplying means 5 can be formed as a solenoid valve such that engine oil supplied from a conventional engine oil pump is used by switching the oil-passing state of the solenoid valve by way of an electrical signal supplied by the controller 1. The solenoid valve 5 preferably uses a bolt from the installation of the supplementary brake to form an oil passage by forming an oil passage through the bolt. A solenoid actuator is added to regulate the oil passage for more effective results in terms of space saving and reduction of the number of parts.

Figure 2:
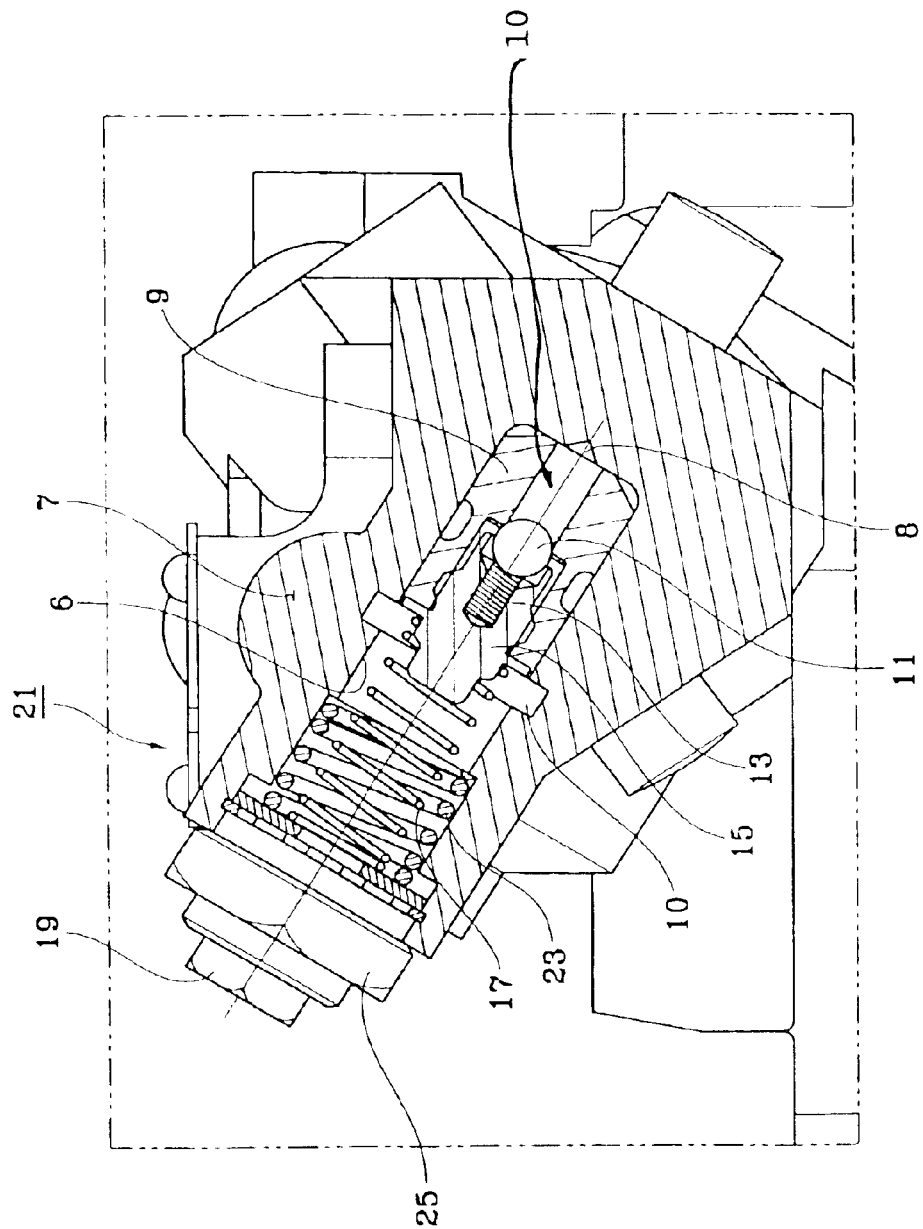
FIG. 2 is a schematic drawing of a control valve illustrated in FIG. 1.

As shown in FIG. 2, the oil pressure control means 21 which may comprise a control valve for regulating oil that has passed the solenoid valve 5 under a constant pressure state, comprises a valve body 7 equipped with a cylindrical cylinder 6. Body 9 is inserted into the cylinder 6 to define a regulating oil passage 10 for regulating the flow of oil in the cylinder 6. A check ball 11 is positioned at one end of regulating oil passage 10. A check piston 15 is mounted to slide within the cylinder 6, with a check spring for resiliently supporting the check ball 11. A constant pressure spring 17 resiliently supports the check piston 15. Closing cap 19 supports the constant pressure spring 17 and closes the cylinder 6.

The closing cap 19 is coupled to the valve body 7 while being resiliently acted on by closing spring 23, in order to further solidify the mounted state as illustrated in the drawing. Closing cap 19 is further fastened by a locking nut 25.

As illustrated in FIG. 1, pulsatory pressure forming means 26 comprises a pulsatory pressure cylinder 27 and a piston 31 mounted to slide within the pulsatory pressure cylinder 27. The piston is acted on by injection cam 29 to control the timing of the injecting oil to the engine. A cam spring 33 resiliently supports the piston 31 toward the injection cam 29.

Figure 3:
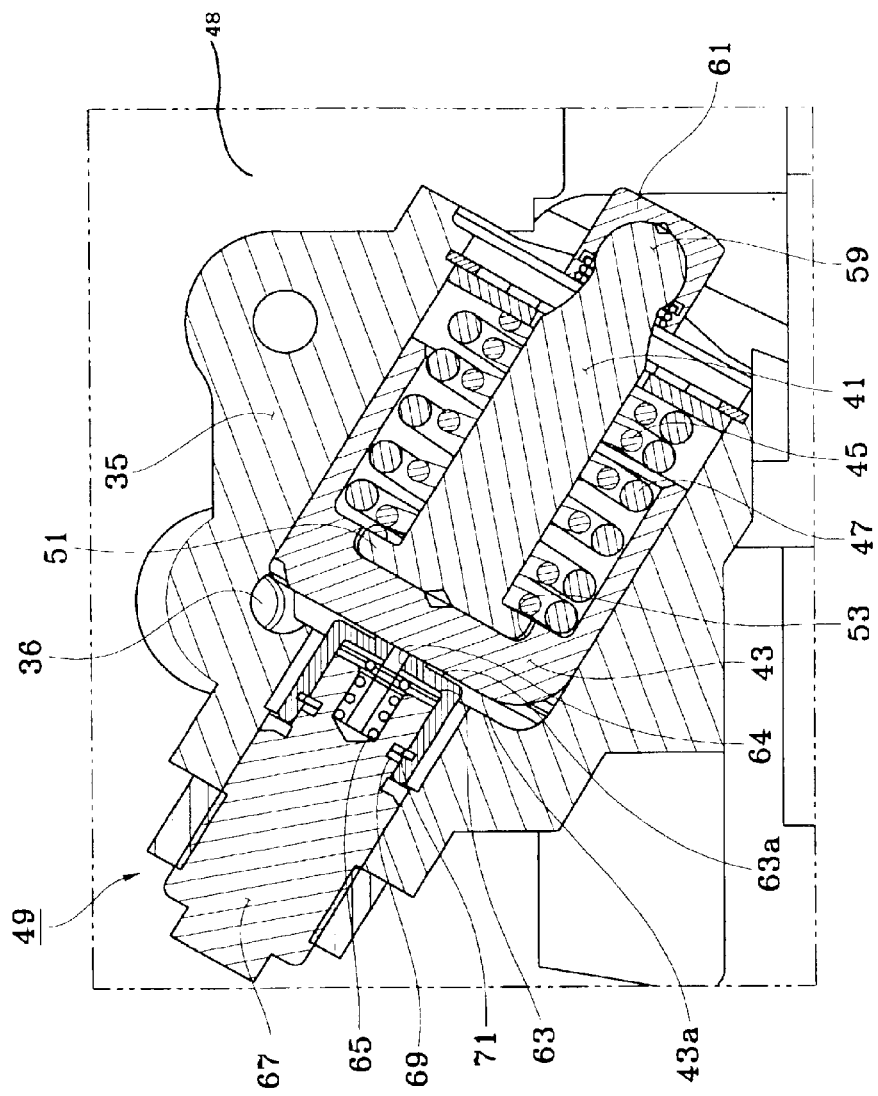
FIG. 3 is a schematic drawing of the opening and closing means illustrated in FIG. 1.

The valve opening and closing means 48, shown in more detail in FIG. 3, includes a valve body 35 and an actuator rod 41 reciprocatively moved by the pulsatory pressure supplied to the valve body 35. Movement of rod 41 provides actuating force for rocker arm 39 for opening and closing exhaust valve 37. An actuator piston 43, and first and second springs 45 and 47, absorb lateral forces from the rocker arm acting on the actuator rod 41. Piston 43, and springs 45 and 47, also act in response to the pulsatory pressure to generate a reciprocating force in the actuator rod. A robolash valve 49 positioned opposite piston 43 comprises a robolash unit for prompting the actuator rod to contact the rocker arm with a pre-load. As used herein, "robolash" means "to regulate a gap". The robolash unit is described in greater detail below.

Actuator rod 41 is formed with a flange 51 that is accommodated in a flange groove 53 formed around the inside of actuator piston 43, as shown in FIG. 3. Flange 51 is resiliently supported by the first spring 45 to permit actuator rod 41 to move with the actuator piston 43. The actuator piston 43 is also resiliently supported by the second spring 47 to provide an elastic force corresponding to the pulsatory pressure provided to a floor surface of the actuator piston 43.

The peripheries of flange 51 and flange groove 53 are preferably smooth, curved surfaces to allow flange 51 to sway at a constant angle relative to the flange groove 53, such that lateral force from rocker arm 39, introduced from the actuator rod 41, can be absorbed. Actuator rod 41 preferably includes a swivel boot 61 mounted over ball part 59 to compensate for angle differences generated in the course of contact with the rocker arm 39.

The robolash unit preferably includes a robolash piston 63 facing the actuator piston 43 and having a smaller floor surface area than that of the actuator piston. A part 63a of the robolash piston 63 is detached at a constant space from a floor surface of the actuator piston 43. Robolash spring 65 and robolash plug 67 force the robolash piston 63 toward the valve body 35. A stroke limiting groove 69, formed at the robolash plug 67, limits slip of the robolash piston 63 in cooperation with a limiting ring 71 mounted at the robolash piston 63.

Hereinafter, the operation of the present invention thus constructed will be described.

When a driver manipulates switch 3 to actuate the supplementary brake while a vehicle is in motion, the controller 1 checks the state of the vehicle. For example, controller 1 checks whether the clutch pedal is in released mode, whether the driver is stepping on the accelerator pedal, and whether the gear shift is placed in neutral position.

When the switch 3 is turned on and the clutch pedal is in released mode and the gear shift is not in the neutral position, engine oil is supplied to the oil pressure supply means 5, and the fuel injection of the engine is blocked, thereby affecting the braking operation. If the clutch pedal is released, if the accelerator pedal is stepped on, or if the gear shift is in the neutral position, the oil pressure supplied to oil pressure supply means 5 is blocked and the engine fuel injection is re-started to stop the supplementary brake operation and to protect the engine.

When the controller 1 actuates supply means 5 to supply engine oil to the oil pressure circuit of the supplementary brake, oil pressure control means 21 allows the oil pressure to be maintained at a constant pressure state and provides a constant oil pressure.

When oil from the supply means 5 is infused into the oil inlet 8 in valve body 7 of control means 21, check ball 11 opens to allow oil to be infused so that only the pressure adjusted by the check piston 15 is discharged to the oil outlet 10 by the constant pressure spring 17. If pressure is reversely transferred from the oil outlet side, the oil passage is blocked by the check ball 11, to thereby supply a constant pressure into the oil pressure circuit at all times.

As a result, the constant pressure thus formed is provided into the valve body 35 of the robolash valve 49 and the pulsatory cylinder 27. The constant pressure supplied to the robolash valve 49 actuates the robolash to prompt the swivel boot 61 at the actuator rod 41 to contact the rocker arm 39 of the exhaust valve 37 at a pre-load.

When constant pressure is supplied to the oil inlet 36 of the valve body 35, the actuator piston 43 overcomes the resilience of the first and second spring 45 and 47 to move to the rocker arm 39 a constant distance. The robolash piston 63 is provided with pressure produced by oil introduced through oil passage 64, plus resilience provided by the robolash spring 65 prompts the robolash piston 63 to move toward the actuator piston 43. The distance moved is restricted to a constant level by the stroke limiting groove 69 and the limiting ring 71. The swivel boot 61 mounted at an end of the actuator rod then provides a pre-load to rocker arm 39 when the robolash piston 63 contacts the bottom floor of the actuator piston 43.

The robolash mechanism prevents the exhaust valve 37 from being affected in operation by any other part during the normal movement of the vehicle and allows the opening/closing of the exhaust valve 37 to be affected by the actuator rod 41 in case auxiliary braking operation is needed. Allowing the swivel boot 61 at the actuator rod 41 to contact the rocker arm 39 with a pre-load prevents noise and durability problems from occurring when the swivel boot 61 and the rocker arm 39 are continuously contacted by rapid reciprocating operation of the actuator rod 41.

Under the conditions thus described, piston 31 in pulsatory cylinder 27 slides along the cam profile of injection cam 29 under the biasing force of the cam spring 33 to provide pulsatory pressure to the oil filled in the pulsatory cylinder 27. The pulsatory pressure thus formed is supplied into the valve body 35 of the robolash valve 49. When the pulsatory pressure is provided, the actuator piston 43 overcomes the first and second springs 45 and 47 to push the actuator rod 41 towards the rocker arm 39, whereby the rocker arm 39 opens the exhaust valve 37.

The exhaust valve 37 is preferably opened near the top dead center of a compression stroke. Fuel supply through the controller 1 is thus blocked at the vicinity of the top dead center of the compression stroke and the exhaust valve 37 is opened to prevent engine power from being generated during an expansion stroke. The power to be consumed thereafter for operation of the pistons is transformed to work force needed for braking.

Because the actuator rod 41 is linearly and reciprocally moved within a constant passage while the rocker arm 39 is rotated through a constant angle, the swivel boot 61 mounted at the end of the actuator rod 41 is pivoted between the actuator rod 41 and the rocker arm 39, to thereby connect the reciprocating motion of the actuator rod 41 with the rotating motion of the rocker arm 39. The lateral force transmitted to the swivel boot 61 and the actuator rod 41 by the operation of the rocker arm 39 is absorbed by the flange 51 at the actuator rod 41 and flange groove 53 in the actuator piston. The first piston resiliently supports flange 51 toward the flange groove 53 to allow the actuator rod 41 to maintain a stable state where a smooth operational force is provided to the actuator rod 41 from the actuator piston 43.

When a driver turns off the switch 3, or the controller 1 detects that the clutch pedal is in released mode, the accelerator pedal is stepped on or a gear shift is in neutral position, the controller blocks the oil pressure supplied from the solenoid valve 5 and re-opens the fuel injection, thereby stopping the braking operation of the supplementary brake and transferring to the normal running state. If oil pressure supplied from the solenoid valve 5 is stopped, oil is discharged to the oil drain passage installed in the valve body 7 of the control valve 21, and the actuator piston 43 and the actuator rod 41 retreat along with retreat of the robolash piston 53 to be spaced from the rocker arm 39 so that the exhaust valve 37 does not interrupt normal engine operation.

As apparent from the foregoing, there is an advantage in the supplementary brake for a vehicle thus described according to the present invention in that fuel injection is blocked near the top dead center compression stroke and an exhaust valve is opened at the same time to allow power needed for piston operation of the engine to be consumed for braking without using power so that no parts such as a butterfly valve and the like having durability problems are needed, thereby allowing use for longer periods and obtaining sufficient braking power at least twice that of the prior-exhaust brake.

What is claimed is:

1. A supplementary brake for a vehicle, the brake comprising:
    oil pressure supplying means;
    oil pressure control means for controlling oil pressure supplied from the oil pressure supplying means, wherein said oil pressure control means comprises:
        a valve body equipped with a cylinder;
        a regulated oil passage formation body inserted into the cylinder to form a regulating oil passage for regulating the flow of oil in the cylinder;
        a check ball positioned at one end of the regulating oil passage of the regulated oil passage formation body;
        a check piston so mounted as to slide within the cylinder and having a check spring resiliently supporting the check ball;
        a constant pressure spring resiliently supporting the check piston; and
        a closing cap supporting the constant pressure spring to the valve body to close said cylinder
    pulsatory pressure forming means for forming a pulsatory pressure to the oil pressure supplied from the oil pressure control means to a profile of an engine injection cam;
    valve opening and closing means for opening and closing an exhaust valve of an engine according to the pulsatory pressure formed by the pulsatory pressure forming means; and
    a controller for controlling said oil pressure supply means according to the operating state of the engine.

2. A supplementary brake for a vehicle, the brake comprising:
    oil pressure supplying means;
    oil pressure control means for controlling oil pressure supplied from the oil pressure supplying means;
    pulsatory pressure forming means for forming a pulsatory pressure to the oil pressure supplied from the oil pressure control means to a profile of an engine injection cam;
    valve opening and closing means for opening an closing an exhaust valve of an engine according to the pulsatory pressure formed by the pulsatory pressure forming means, wherein the valve opening and closing means comprises;
        a valve body;
        an actuator rod reciprocatively moved by pulsatory pressure inside the valve body to provide an actuating force to a rocker arm for opening and closing the exhaust valve;
        an actuator piston and first and second springs absorbing lateral force acting on the actuator rod from the rocker arm and utilizing the pulsatory pressure to generate a reciprocating force from the actuator rod;
        a robolash unit prompting the actuator rod to contact the rocker arm with a pre-load; and
    a controller for controlling said oil pressure supply means according to the operating state of the engine.

3. The brake as defined in claim 2, wherein the robolash unit comprises: a robolash piston facing the actuator piston and having a smaller floor surface area than that of said actuator piston and having a part detached at a constant space from the floor surface of said actuator piston; a spring and a plug supporting said robolash piston toward the valve body; a stroke limiting groove formed at the plug, limiting the slip of said robolash piston and a limiting ring mounted at said robolash piston.

4. The brake as defined in claim 2, wherein said actuator rod is mounted at an end thereof with a swivel boot absorbing an angle difference generated in the course of contact with the rocker arm.

* * * * *